United States Patent
Kenney et al.

(10) Patent No.: US 8,805,420 B2
(45) Date of Patent: Aug. 12, 2014

(54) SYSTEMS AND METHODS FOR IMPLEMENTING INTELLIGENT WIDEBAND DIGITAL FREQUENCY SELECTION SCANNING

(75) Inventors: Thomas Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 13/532,622

(22) Filed: Jun. 25, 2012

(65) Prior Publication Data

US 2013/0252640 A1     Sep. 26, 2013

Related U.S. Application Data

(60) Provisional application No. 61/614,337, filed on Mar. 22, 2012.

(51) Int. Cl.
    *H04W 24/00*      (2009.01)
(52) U.S. Cl.
    USPC .................. 455/456.4; 455/456.1; 455/456.2; 455/456.3; 455/456.5; 455/456.6
(58) Field of Classification Search
    USPC ............................................ 455/456.1–456.6
    IPC .................. H04W 4/025,64/003, 4/028, 24/00, H04W 4/021, 4/026, 4/043, 64/00, 24/10, H04W 4/027, 4/04, 24/02, 40/20, 48/16, H04W 4/26, 52/0251, 64/006, 68/00, 76/021, H04W 88/16; G01C 21/00; G01S 5/0036, G01S 5/10, 11/02, 13/878, 19/34, 19/47, 19/48, 3/74, 5/0018, 5/02, 5/0205, 5/06, G01S 5/14, 5/24; G06F 17/30268
See application file for complete search history.

(56) References Cited

U.S. PATENT DOCUMENTS

| | | | |
|---|---|---|---|
| 2005/0197136 A1* | 9/2005 | Friday et al. | 455/456.1 |
| 2006/0267783 A1* | 11/2006 | Smith | 340/601 |
| 2007/0173199 A1* | 7/2007 | Sinha | 455/67.11 |
| 2009/0015459 A1* | 1/2009 | Mahler et al. | 342/22 |
| 2011/0223935 A1* | 9/2011 | Alfano et al. | 455/456.1 |
| 2012/0052900 A1* | 3/2012 | Liu et al. | 455/515 |
| 2013/0115969 A1* | 5/2013 | Holmes et al. | 455/456.1 |

* cited by examiner

*Primary Examiner* — Olumide T Ajibade Akonai
*Assistant Examiner* — Edward Zhang
(74) *Attorney, Agent, or Firm* — Ellis B. Ramirez; Prass LLP

(57) ABSTRACT

A system and method are provided to intelligently undertake mandated scanning for radar signals prior to operating a particular wireless device in the 5 GHz band. The disclosed systems and methods provide a capability by which wireless devices are enabled to intelligently scan using a 160 MHz signal, or the largest bandwidth that the wireless device has the capacity to occupy. The disclosed scheme makes use of information about the location of the wireless device to determine characteristic of the environment in which the wireless device is operating. Locations of potentially conflicting radar installations, such as at airports and on military installations, are generally "known." This information is used to compare to a determined geographic location of the wireless device to assess whether full broad bandwidth DFS scanning cane be reasonably undertaken or whether some narrower channel scanning is appropriate for the wireless device based on proximity to radar installations.

39 Claims, 3 Drawing Sheets

SYSTEMS AND METHODS FOR IMPLEMENTING INTELLIGENT WIDEBAND DIGITAL FREQUENCY SELECTION SCANNING

This application claims priority to U.S. Provisional Patent Application No. 61/614,337, filed Mar. 22, 2012, entitled "A METHOD TO AVOID UNAUTHORIZED USE OF DYNAMIC FREQUENCY SPECTRUM BANDS BY USING INFORMATION REGARDING A LOCATION OF A WIRELESS COMMUNICATION DEVICE WITH RESPECT TO KNOWN RADAR SITES," the disclosure of which is hereby incorporated by reference herein in its entirety.

BACKGROUND

1. Field of the Disclosed Embodiments

This disclosure relates to systems and methods for implementing intelligent Digital Frequency Selection (DFS) scanning using geographic location pre-screening in wireless devices.

2. Related Art

The IEEE 802.11ac (Pending) standard is a next generation wireless computer networking standard in the IEEE 802.11 series. The 802.11ac standard is currently under development and is expected to provide standards for systems and devices that support high-throughput Wireless Local Area Networks (WLAN) in the 5 GHz band. This standard is anticipated to enable multi-station WLAN throughput of at least 1 Gigabit/sec, with improvements over IEEE 802.11n (an amendment which improves upon the previous 802.11 standards by adding multiple-input multiple-output antennas (MIMO) and operates on both the 2.4 GHz and the 5 GHz bands, approved and published in October 2009).

The 802.11ac standard is for systems and devices that will operate in the 5 GHz band only. Very High Throughput (VHT) portions of the standard will not be supported on the 2.4 GHz band. In the proposed 802.11ac standard, new channel bandwidths are added to those of the 802.11a/n standards. In the 802.11a/g standard, the channel bandwidth was specified to be only 20 MHz. In the 802.11n standard, a 40 MHz channel bandwidth option was added. The 802.11ac standard provides two additional larger channel bandwidths, 80 and 160 MHz.

An issue in using the 5 GHz band for unlicensed wireless communications is that full use of at least the wider bandwidths provided by the 802.11ac standard requires operation in the Dynamic Frequency Selection (DFS) bands of the 5 GHz band. The DFS bands are certain portions of the 5 GHz band that have stringent requirements imposed by regulatory agencies such as the Federal Communications Commission (FCC) in the United States for unlicensed devices attempting to operate in these portions of the 5 GHz band. DFS scanning is a mechanism that allows unlicensed devices to share the spectrum in the 5 GHz band with existing radar systems operating in this band, e.g., weather radars and airport radars, subject to certain conditions that are imposed to attempt to limit interference with those radar systems.

SUMMARY OF THE DISCLOSED EMBODIMENTS

The requirements for communications in the DFS bands include scans for radar detection probabilities that may necessitate long scan intervals, particularly as intended bandwidths increase. FIG. 1 illustrates an overview 100 of the 5 GHz band as discussed in this disclosure. For reference, FIG. 1 shows the frequency allocation 110,120 for communication in the 5 GHz band, and is individually segmented at 130-160 to show, respectively, 20, 40, 80 and 160 MHz channel bandwidths as they may be operated in the 5 GHz band. Also shown, in the shaded portion of FIG. 1, is the DFS portion 170,180 of the 5 GHz band.

For larger channel bandwidths of 80 and 160 MHz, operation in the DFS bands is basically mandatory. As shown in FIG. 1, for an 80 MHz bandwidth, only two channels are located outside the DFS bands, and for 160 MHz bandwidth, there are no channels that are not at least partially in the DFS bands 170,180.

The requirements to operate in the DFS bands include an initial sixty second duration scan in each channel that a wireless device intends to operate. The purpose of the scan is to detect the presence of any radar system operating in the area of the wireless device. If a radar system is detected (correctly or incorrectly) by the scan by the wireless device in any channel in which the wireless initiates the scan, the wireless device is precluded from operating on any scanned channel for a period of thirty minutes at which time a new scan is initiated. Thus, any wireless device, at the point that it turns on, and before it operates in the 5 GHz band on any channel, must scan the channels that the wireless device intends to use for at least sixty seconds. This scan is required each and every time that the wireless device is turned on, or at any time that the device is relocated to a new location.

It is possible to have potentially participating wireless devices operate in the 5 GHz non-DFS bands, but such operation limits the channel bandwidths in which these wireless devices can operate. This limitation affects all potentially participating wireless devices including, for example, wireless access points that are intended to support many users or multiple video streams, or individual wireless client devices using Wi-Fi direct communications. Operating outside the DFS bands significantly inhibits an advantage of devices operating according to the 802.11ac standard employing the larger operational channel bandwidths. The operations in the 40, 80 and 160 MHz channels provide a potential for data rate increases of up to 2×, 4× and 8× over 20 MHz, respectively.

The concern about the use of the DFS bands with the 802.11ac standard wireless devices manifests itself in the potentially very large scan times that may be required in order to declare a channel clear for use with these larger bandwidths. In the case of 160 MHz, the potentially participating wireless device would have to scan eight separate 20 MHz sub-channels to identify a 160 MHz free channel. This would take at least eight minutes each time the device starts up or relocates. Further, in scanning the 160 MHz channel as a whole, in an effort to reduce this elapsed time, if a radar is detected, either correctly or incorrectly (false detect), the wireless device would be precluded from operating in the entire 160 MHz channel for thirty minutes.

In view of the above shortfalls difficulties, it may be advantageous to find some manner by which the clearance of larger channel bandwidths could be streamlined while avoiding the possibility of a thirty minute preclusion from communications operations in the 5 GHz band.

Exemplary embodiments of the disclosed systems and methods may provide an intelligent scheme by which wireless devices operating in the DFS bands may meet mandated scanning requirements expeditiously and with minimal risk of preclusion.

Exemplary embodiments may provide a wireless device to scan using a 160 MHz signal, or the largest bandwidth that the wireless device wishes to occupy, e.g., 160, 80 or 40 MHz according to a scheme that reduces a risk of detecting a radar installation by executing a first order geographic deconfliction between the wireless device and know radar installations prior to initiating the scan. Exemplary embodiments may use information about the location of the wireless device to assess characteristic of the environment within which the wireless device is operating including the presence or absence of any potentially conflicting radar installations.

Exemplary embodiments of an installed wireless access point device may provide that the first time the device is turned on the device senses location information to determine if the wireless device is potentially located near any known radar sites. A database of known radar installation locations may be consulted in order to determine that a location of the wireless access point device is not in proximity to any of the known radar installation locations.

Exemplary embodiments of mobile wireless devices including, for example, laptop computers or smartphones, may employ information available from a position location device to determine if the mobile wireless device is potentially located near any known radar sites. The position location device may be a Global Positioning Satellite (GPS) receiver that provides GPS information on the location of the mobile wireless device. Alternatively, the position location device may be a device that measures and correlates cellular location information from one or more cell sites to determine the location of the mobile wireless device.

Exemplary embodiments may rely on the generally static nature of radars supporting, for example, airports and government installations to largely "pre-clear" an operating area for the mobile device in a manner that will allow the device to most expeditiously satisfy the mandated DFS scanning, detecting and clearing requirements.

In exemplary embodiments, once the wireless device determines that its location is not proximate to known radar installations, the device may immediately perform a scan using the widest channel bandwidth available in the wireless device. Such a scan may be undertaken with the "knowledge" that not being near a known installation generally means that no radars are present and the risk of the preclusion from using the entire band for thirty minutes may be generally avoided. With this novel freedom, exemplary embodiments may employ upgraded or better detection techniques. Better detection techniques, which may take a bit longer, may aid in better minimizing a false radar detection probability. With the disclosed techniques, larger channel bandwidths could be scanned with a delay of only about one minute to the user, instead of at least eight minutes to conduct the scanning in a more piecemeal fashion to avoid the preclusion. Alternatively, if the wireless device is determined to be located near any radar installation, the wireless device may scan using only channel bandwidths outside the DFS bands or narrower channel bandwidths that may then be aggregated to achieve the available channel bandwidth of the device.

In exemplary embodiments, wireless devices that operate in the same location frequently and are power cycled, like a wireless access point, may use the previous knowledge of the location and the results of a scanning when they were previously powered up to initiate subsequent scans on power up. Likewise, for a laptop computer or smartphone, its location information could be used initiate a smart scan based on saved results about previous connections at a particular location and the "known" presence of any radar systems in proximity to the location of the wireless device.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing intelligent Digital Frequency Selection (DFS) scanning using location pre-screening will be described, in detail, with reference to the following drawings, in which.

DETAILED DESCRIPTION OF THE DISCLOSED EMBODIMENTS

The systems and methods for implementing intelligent Digital Frequency Selection (DFS) scanning using location pre-screening will generally refer to this specific utility for those systems and methods. Exemplary embodiments described and depicted in this disclosure should not be interpreted as being specifically limited to any particular combination of communicating capabilities or applications, or to any specific system infrastructure. In fact, any selective location-aided wireless connectivity scheme, and any complementary configuration for a wireless device capable of determining its location for comparison to a database for possible interference-prone conflicting systems that may benefit from the systems and methods according to this disclosure is contemplated.

Specific reference to, for example, any particular wireless device, whether generally static or mobile, should be understood as being exemplary only, and not limited, in any manner, to any particular class of wireless devices, such as, for example, smartphones, netbooks, notebook computers, electronic tablets, wireless capable PDAs or the like, or to any particular class of wireless systems acting as wireless access points to one or more wireless networks. The systems and methods according to this disclosure will be described as being particularly adaptable to being hosted on wireless devices operating in the 5 GHz band, and employing DFS scanning, but should not be considered as being limited to only these classes of wireless communicating devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Figure 1:
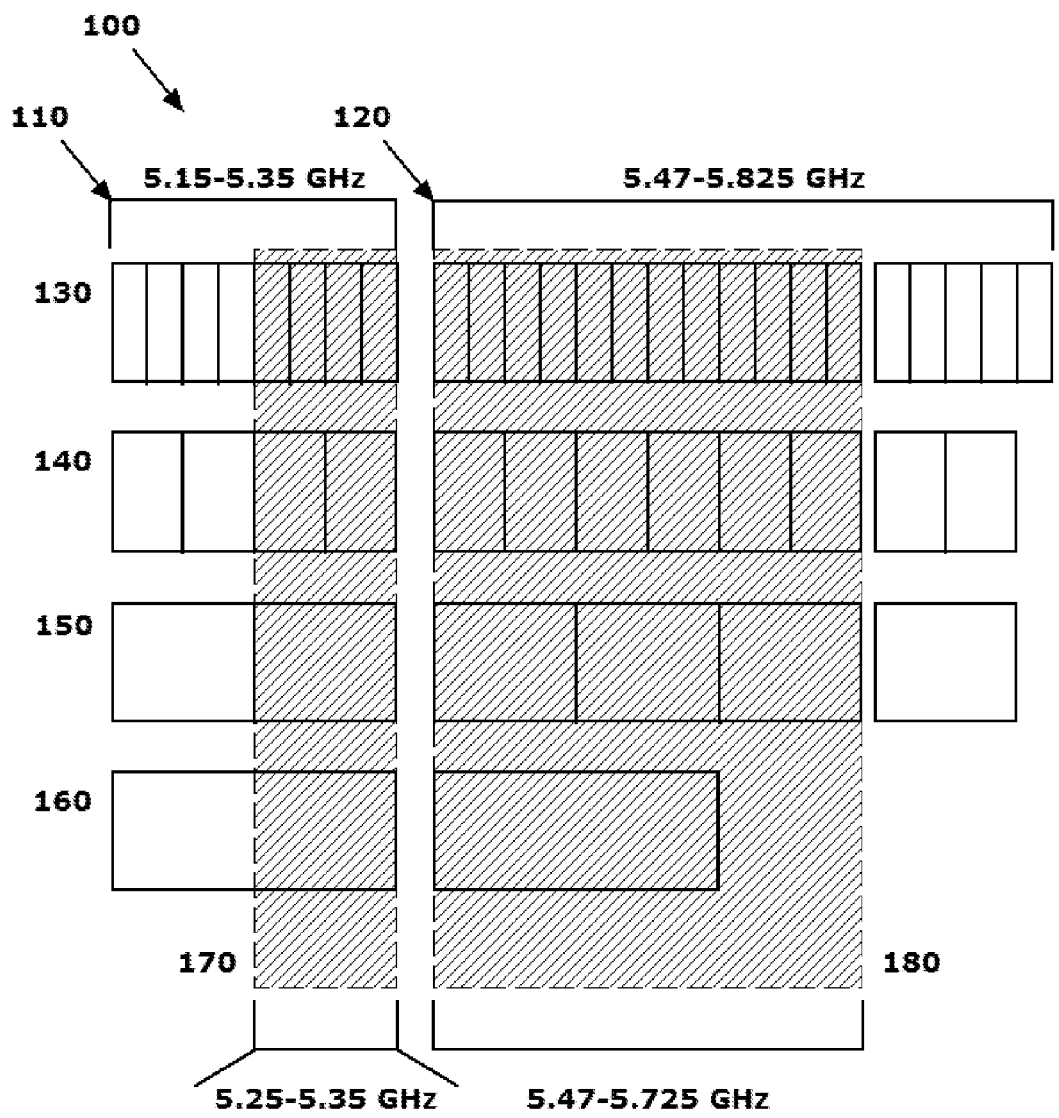
FIG. 1 illustrates an overview of the 5 GHz band as discussed in this disclosure;\

As indicated above, with systems operating according to the proposed 802.11ac standard, channel bandwidths of 20, 40, 80 and 160 MHz may be realized. As shown in FIG. 1, the DFS bands are a major portion of the total 5 GHz spectrum band. There are only nine 20 MHz channels, four 40 MHz channel or two 80 MHz channels available that are outside the DFS bands. No 160 MHz channels lie entirely outside of the DFS band. To obtain full use of all of the 20, 40 and 80 MHz channels, and any use of the 160 MHz channels, requires mandated DFS scanning to search for potentially conflicting radar sites.

Every time a wireless device is turned on, or moves significantly, the wireless device must scan the channels that the wireless device intends to employ to determine if any radar is in operation in the portion of the 5 GHz band covered by those channels. In earlier versions of the 802.11 standards, DFS scanning presented less of an impediment to routine operations because fewer devices populated the 5 GHz band and there were several options for channel access according to the device capabilities with 20 or 40 MHz channels available outside the DFS bands. For devices operating according to the 802.11ac standard, an ability to operate in larger channel bandwidths allows full exploitation of the capabilities of those devices. As a result, avoiding the DFS bands at some point may not be an option. The scanning requirement is sixty seconds per channel band, so if a wireless device is going to make use of 160 MHz, and wants to avoid preclusion, the wireless device may scan eight 20 MHz channel bands, which would take a minimum of eight minutes. This approach balances the requirement for a broad channel with avoiding the possibility of the thirty minute preclusion when a radar is correctly or incorrectly detected. The specification is clear that, if a wireless device chooses to scan a larger channel perhaps than was needed, and a radar is detected, that wireless device is precluded from operating on any channel included in the portion of the 5 GHz band that the wireless device scanned. There is a cost, therefore, not only in time, but also in power, which particularly affects portable, battery-powered wireless devices that must dedicate a portion of their limited power resources to the scanning rather than to communication and data exchange.

It is understood that a wireless device could just scan the 160 MHz as a single channel at once, but if it detects a radar, either correctly or incorrectly (false detect), it must stay off that entire 160 MHz band for the full thirty minutes. At a minimum, this would limit the device to a lower bandwidth of operation if the false detection occurred. In a worst case, this scenario could disallow the wireless device from obtaining any service at all if other non-DFS channels are congested with other wireless devices. Again, there are only a few non-DFS channels, so in a heavily populated area, this preclusion becomes a strong possibility.

Another approach would be to replicate eight separate hardware processing paths, which would process each of the different 20 MHz channels independently. Since this processing is done in the time-domain, it would require a significant amount of hardware replication, thus increasing cost and further taxing limited power resources in reduced battery life for mobile wireless devices that are not plugged into an outlet.

The disclosed systems and methods are intended to provide a capability by which wireless devices are enabled to intelligently scan using a 160 MHz channel bandwidth, or the largest channel bandwidth that the wireless device has the capacity to occupy (160, 80 or 40 MHz). The disclosed scheme relies on information about the location of the wireless device, for example, the wireless access point or wireless mobile device, to determine the characteristic of the environment in which the wireless device is operating. As mentioned above, wireless access points may have "known" locations and mobile wireless devices may rely on internal geolocation reference units to provide, for example, GPS information and/or cellular location information from cell sites, to determine a current location of the device. Even setup information about an installation, potentially input by a user, may be relied upon.

The main uses of the radar signals at issue are those of airport installations and government installations. The locations of these installations are, therefore, "known." In the case of airports, the wireless device would be aware, through the disclosed scheme, whether it was within a certain range of any airports. Next, the wireless device would be aware, through the disclosed scheme, whether it was near any military installations, such as a military base.

Information available from multiple sources can provide a basis by which to populate a database for any specific geographic location to specify where radar installations are located. This data is generally publicly available, for example, by a number of methods including Google® maps or the like.

The database including location data for radar installations may be used to deconflict a location of a particular wireless device from locations of radar installations operating in the 5 GHz band in order to select a mode by which the wireless device may conduct DFS scanning. For example, based on a known "clear" distance from any radar installation, a wireless device may choose to execute a single scan of a large channel bandwidth, e.g., 160 MHz, available to the particular wireless device with a low risk that such a broad channel bandwidth scan may result in the thirty minute preclusion based on detection of any radar operating in the scanned channel bandwidth. In other words, based on a very high probability that no radar will be detected given the step of geographic deconfliction, the wireless device may execute a single scan of all 160 MHz in one minute vice undertaking individual 20 MHz channel scans taking a total of eight minutes. In sixty seconds then, using this method, the wireless device will be able to establish a 5 GHz communication link rather than waiting an ensuing seven minutes to return channel clear information for a 160 MHz channel bandwidth. The geographic deconfliction provides a relative level of confidence that no radar will be detected thereby precluding use of any channel for an ensuing thirty minutes.

Conversely, if the wireless device determines, based on a query of the database or other geographic location comparison method, that it is proximate to a radar installation, the wireless device may conduct the scanning in a reasonably intelligent manner. The wireless device may determine, in a first instance, that it must scan each 20 MHz channel bandwidth separately, or otherwise that there are certain channel combinations that it may scan while avoiding a known proximate radar installation. The wireless device may, for example, learn over time which channels it may scan with a lesser degree of probability that a conflict with a broadcasting radar may be encountered.

The wireless device may automatically select a particular mode for undertaking the required DFS scanning based on information provided regarding the location of the wireless device and comparing that to information regarding locations of radar installations, which may be stored in a database.

The above briefly-mentioned learning technique may be used to augment reduced startup times for devices that operate in the same location frequently, but which may be power cycled like a static, or permanently installed, wireless access point. Knowledge of the location and the results of the scanning when the wireless device was previously powered on may be referenced to initiate a current scan. A smart scan may be undertaken based on saved results about previous connections at a particular location and the presence of any radar systems in cases where such information is collected and stored from power on to power on in the wireless device. In all cases, it is envisioned that the wireless devices may preferably scan using the largest channel bandwidth accommodated by the wireless devices, as modified by the pre-screening location data indicating the potential presence or absence of conflicting radar systems.

It should be noted that geolocation deconfliction and saved/learned information regarding previous scans are all designed to expedite the scanning process, not to replace it. The mandates are clear that wireless devices operating in the DFS bands must perform a DFS scan each time the wireless device is turned on or moved significantly to a new area, regardless of previous scan results or other information. The disclosed scheme of using location information and saved information will result in significant decreases in scan times for wireless devices using larger channel bandwidths, without incurring the penalty associated with falsely detecting a radar signal. Put another way, these techniques allow the wireless device to operate in the DFS bands with wider channel bandwidths without the impact of very long scan times, which would be highly undesirable from a user perspective based on the time delays themselves and the potentially sever impact on battery life.

Figure 2:
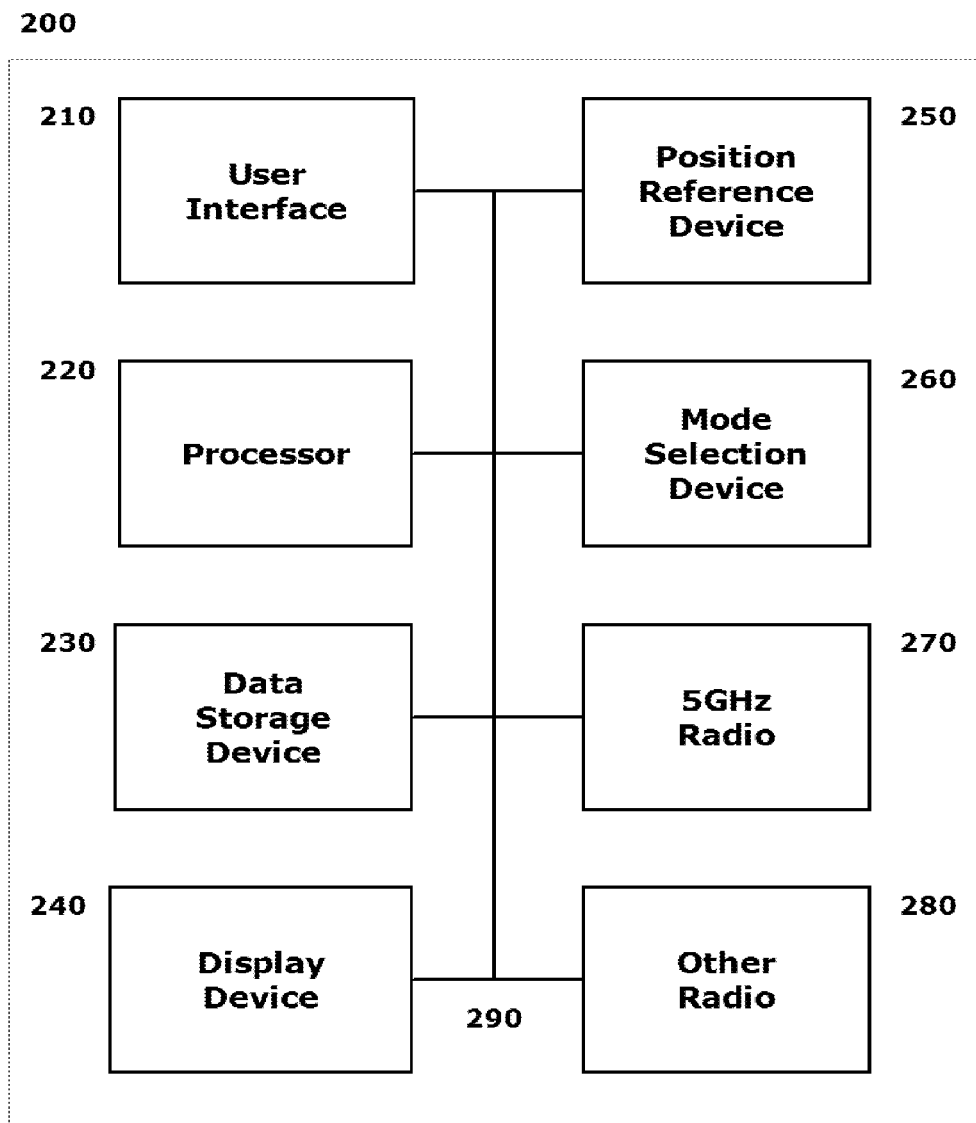
FIG. 2 illustrates a block diagram of an exemplary wireless device for implementing intelligent DFS scanning using location pre-screening according to this disclosure.

FIG. 2 illustrates a block diagram of an exemplary wireless device 200 for implementing intelligent DFS scanning using location pre-screening according to this disclosure. The wireless device 200 may be, for example, a mobile wireless device such as a smartphone, tablet, PDA or other like mobile device. The client device 200 may otherwise be a substantially fixed wireless unit such as, for example an installed or semi-installed wireless access point.

The wireless device 200 may include a user interface 210 by which the user can communicate with the wireless device 200, and may otherwise communicate information via the wireless device 200 to a network node with which the wireless device 200 is in wired or wireless communication, or a combination of the two. The user interface 210 may be configured as one or more conventional mechanisms that permit a user to input information to the wireless device 200. The user interface 210 may include, for example, an integral keyboard, or a touchscreen with "soft" buttons for communicating commands and information to the wireless device 200. The user interface 210 may alternatively include a microphone by which a user may provide oral commands to the wireless device 200 to be "translated" by a voice recognition program or otherwise. The user interface 210 may otherwise include any other like device for user operation of, and data exchange with, the wireless device 200. A user may make inputs via the user interface 210 to turn the wireless device on thereby initiating a communication, geolocation and scanning process for the wireless device 200.

The wireless device 200 may include one or more local processors 220 for individually undertaking the processing and control functions that are carried out by the wireless device 200. Processor(s) 220 may include at least one conventional processor or microprocessor that interprets and executes instructions and processes outgoing and incoming data via the different communication links in the wireless device 200 according to the methods of this disclosure.

The wireless device 200 may include one or more data storage devices 230. Such data storage device(s) 230 may be used to store data, and operating programs or applications to be used by the wireless device 200, and specifically the processor(s) 220. Data storage device(s) 230 may include a random access memory (RAM) or another type of dynamic storage device that stores information and instructions for execution by the processor(s) 220. Data storage device(s) 230 may also include a read-only memory (ROM), which may include a conventional ROM device or another type of static storage device that stores static information and instructions for execution by the processor(s) 220. The data storage device(s) 230 will generally be those that are integral to the wireless device 200. Otherwise, the data storage device(s) 230 may include a remote data storage device external to the wireless device 200 that is in wireless communication with the wireless device 200 specifically for facilitating the intelligent DFS scanning scheme according to this disclosure. The data storage device(s) 230 may store information on locations of radar installations to be used in a geolocation pre-screening process, as described above.

The wireless device 200 may include at least one data display device 240 which may be configured as one or more conventional mechanisms that display information to the user of the wireless device 200 for operation of the wireless device 200 in its various operating modes, or otherwise for displaying, for example, geolocation data, results of a geolocation pre-screening, a DFS scanning mode in which the wireless device 200 is operating to complete the required DFS scanning, a result of the DFS scanning and/or other indications that may be beneficial to a user in establishing communications with and operating the wireless device 200.

The wireless device 200 may include one or more position reference devices 250. Such position reference devices 250 may comprise, for example, a GPS receiver for receiving GPS location information by the wireless device 200, and/or may include an inertial navigation unit or other like device, such as a cellular geolocator that triangulates cellular sites to establish a position of the wireless device, that can localize a position of the wireless device 200 for use. The wireless device 200 may be able to provide, upon request, location information for a current location of the wireless device 200. An ability of the wireless device 200 to localize its position using one or more position reference devices 250 may facilitate the intelligent DFS scanning scheme according to this disclosure.

The wireless device 200 may include a DFS scanning mode selection device 260 by which, based on a comparison of a geolocation of the wireless device 200 with information on geographic locations of various radar devices, may direct selection of a mode in which the wireless device 200 may conduct DFS scanning. For example, the mode selection device 260 may automatically determine and direct DFS scanning to be undertaken in a first mode across a single channel that is the broadest channel bandwidth that the wireless device 200 may accommodate, e.g., 160 MHz. Otherwise, the mode selection device 260 may automatically determine and direct that the DFS scanning be undertaken in a second mode across multiple narrower channels that, once deemed clear, may be aggregated to arrive at the broad channel bandwidth coverage that the wireless device 200 may accommodate.

The wireless device 200 may include at least a 5 GHz radio 270 as a primary communication radio. It is the inclusion of such a 5 GHz radio 270 that reasonably necessitates operations according to the intelligent DFS scanning scheme of this disclosure.

The wireless device 200 may also heterogeneously combine at least one other radio 280 that operates in a different frequency band. The other radio may include, for example, at least a cellular radio, a Wi-Fi radio, or a mmWave radio, each of which represents an external data communication interface for specific communication with different communication links that the may be able to established when the wireless device is precluded from establishing communication over 5 GHz band.

All of the various components of the wireless device 200, as depicted in FIG. 2, may be connected by one or more data/control busses 290. The data/control bus(ses) 290 may provide internal wired or wireless communication between the various components of the wireless device 200, as all of those components are housed integrally in the wireless device 200.

It is anticipated that the various disclosed elements of the wireless device 200 may be arranged in combinations of sub-systems as individual components or combinations of components, but that, regardless of the specific configuration, all of the depicted components may be integral to a single unit that is the wireless device 200. Otherwise, individual components or combinations of components may be remotely dispersed in multiple locations and in wired or wireless communication with other of the individual components of the wireless device 200 that may communicate with those components via means other than the 5 GHz radio 270 until the required DFS scanning is complete and communication may be established using the 5 GHz radio 270. In other words, no specific configuration as an integral unit or as a support unit, or as several units or sub-systems widely dispersed, for the wireless device 200 is to be implied by the depiction in FIG. 2.

Figure 3:
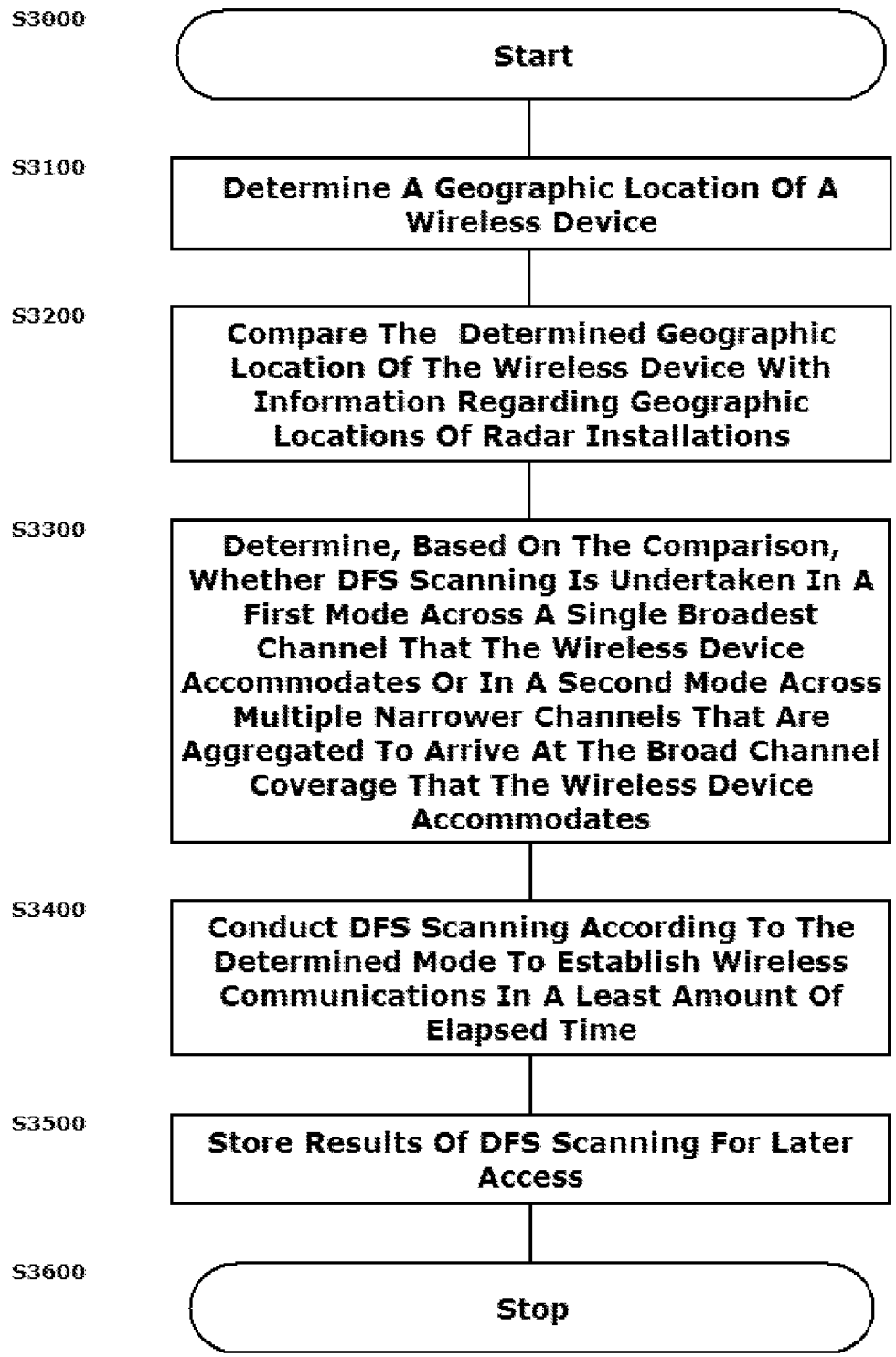
FIG. 3 illustrates a flowchart of an exemplary method for implementing intelligent DFS scanning using location pre-screening in a wireless device according to this disclosure.

FIG. 3 illustrates a flowchart of an exemplary method for implementing intelligent DFS scanning using location pre-screening in a wireless device according to this disclosure. As shown in FIG. 3, operation of the method commences at Step S3000 and proceeds to Step S3100.

In Step S3100, a geographic location the wireless device may be determined. This determination may be made autonomously by the wireless device, or otherwise may be, at least in part, based on information provided to the wireless device by a user. The wireless device may, for example, be a wireless access point that, upon being installed in a specified location including in a structure, obtains a specific location information of the installation/structure as part of, for example, a setup routine. Otherwise, the wireless device may be a mobile wireless device including, for example, a smartphone, laptop computer, a tablet computer, a notebook device, a PDA or other like wireless device. Such a mobile wireless device may include an internal system, unit or device for determining a geographic position of the mobile wireless device at any time. Examples of information by which a mobile wireless device may determine its own location include obtaining GPS information through a GPS receiver, referencing some manner of inertial navigation system, or obtaining cellular location information from cellular sites with which the mobile device is communicating for operations. Operation of the method proceeds to Step S3200.

In Step S3200, the wireless device may compare it is determined geographic location with information regarding geographic locations of radar installations in a vicinity of the determined geographic location for the wireless device. Such information regarding geographic locations of radar installations is available from myriad sources. This information may be stored in a database that may be queried by the wireless device, or otherwise may be available by any communication link via which the wireless device is able to communicate, for example, with the Internet. Operation of the method proceeds to Step S3300.

In Step S3300, a determination may be made regarding how the wireless device intends to proceed with mandated DFS scanning based on "known" locations of radar installations, proximity to those radar installations or clearance from any radar installations in a vicinity of the wireless device. This determination will be based on the comparison of the determined geographic location of the wireless device with the information regarding geographic locations of the radar installations obtained in Step S3200. The wireless device may, for example, determine whether DFS scanning may be undertaken in a first mode across a single broadest channel bandwidth that the wireless device may accommodate, e.g., 160 MHz. Otherwise, the wireless device may determine that DFS scanning should more appropriately be undertaken in the second mode across multiple narrower channels that, once determined to individually be clear, may be aggregated to arrive at the broad channel bandwidth coverage that the wireless device accommodates. In this mode, individual 20 or 40 MHz channels may be scanned and then aggregated to arrive at an 80 or 160 MHz channel for data communication in the 5 GHz band. Operation of the method proceeds to Step S3400.

In Step S3400, the wireless device may conduct DFS scanning in accordance with the manner determined in Step S3300. For example, the DFS scanning may be undertaken in a first mode, or in a second mode, as described above, according to known conditions regarding proximity of the wireless device to any radar installation that may be subject to interference from operations of the wireless device in the 5 GHz band. Operation of the method proceeds to Step S3500.

In Step S3500, results of the DFS scanning, regardless of the mode in which the DFS scanning is undertaken by the wireless device, may be stored for later use. Such later use may include, for example, providing information that may aid in later scans with the wireless device in a particular geographic location. Operation of the method proceeds to Step S3600, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional "known" or components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, including as program modules to be executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of wireless devices, and communication equipment and computing system configurations.

Embodiments may also be practiced in distributed network communication environments where tasks are performed by local processing devices, generally as outlined above, some components of which are linked to each other by hardwired links, wireless links, or a combination of both through a cooperating communication network. In a distributed network environment, program modules, and any accumulated databases, may be located in both local and remote data storage devices.

Embodiments within the scope of the present disclosure may also include computer-readable media having stored computer-executable instructions or data structures that can be accessed, read and executed by a particular module or device in, for example, the described wireless devices. Such computer-readable media can be any available media that can be accessed by a processor in, or in communication with, a wireless device executing the DFS scanning scheme according to this disclosure. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause network components, or a processor in, for example, a wireless device, to perform certain of the above-specified functions, individually, or in combination. Computer-executable instructions also include program modules that are remotely stored for access by the wireless device to be executed by processors in the wireless device when it is caused to communicate in the disclosed network environment across any communication links, particularly those other than in the 5 GHz band as described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply that all of the depicted and described steps must be executed as part of the method, or that the steps need to be executed in any particular order, except as may be necessarily inferred when one of the depicted steps is a necessary precedential condition to accomplishing another of the depicted steps. The depicted steps may be executed in series or in parallel, as applicable.

Although the above description may contain specific details, they should not be construed as limiting the claims in any way. Other configurations of the described embodiments of the disclosed systems and methods are part of the scope of this disclosure. For example, the principles of the disclosure may be applied to each individual wireless device where each individual wireless device may individually and independently operate within the depicted and described system and perform its own DFS scanning as required by mandate. This enables each user of a wireless device to use the benefits of the disclosure even if any one of the large number of possible applications do not need a specific aspect of the functionality described and depicted in this disclosure. In other words, there may be multiple instances of the separate wireless devices each processing the content in various possible ways. It does not necessarily need to be one system used by all end users or undertaken identically by each wireless device. Accordingly, the appended claims and their legal equivalents should only define the disclosure, rather than any specific examples given.

We claim:

1. A method that facilitates wireless communication, comprising:
   determining a location of a wireless device;
   comparing, with a processor, the determined location of the wireless device with information regarding potentially conflicting broadcasting devices located in proximity to the determined location of the wireless device;
   selecting based on the comparing a channel scanning scheme to determine actual conflicts with broadcasting devices; and
   executing the selected channel scanning scheme;
   wherein the wireless device operates in the 5 GHz band, the potentially conflicting broadcasting devices being radar installations operating in Digital Frequency Selection (DFS) bands, and the selected channel scanning scheme complying with DFS scanning requirements.

2. The method of claim 1, the comparing of the determined location of the wireless device with information regarding the radar installations located in proximity to the determined location of the wireless device including querying a database of known radar installation locations.

3. The method of claim 2, the selecting of the channel scanning scheme comprising selecting a first channel scanning scheme when the comparing indicates that there are no radar installations in proximity to the determined location of the wireless device, the first channel scanning scheme scanning a single channel bandwidth that is greater than 20 MHz and is the broadest channel bandwidth that the wireless device accommodates.

4. The method of claim 3, the broadest channel bandwidth that the wireless device accommodates being 160 MHz.

5. The method of claim 2, the selecting of the channel scanning scheme comprising selecting a second channel scanning scheme when the comparing indicates that there is at least one radar installation in proximity to the determined location of the wireless device, the second channel scanning scheme incrementally scanning single channel bandwidths of not more than 40 MHz that are aggregated, once determined to be clear, to achieve an aggregated channel bandwidth of at least 80 MHz.

6. The method of claim 5, the aggregating achieving an aggregated channel bandwidth of 160 MHz.

7. The method of claim 1, the determining the location of the wireless device comprising receiving at least one of GPS information using a GPS receiver, cellular information using a cellular receiver, Wi-Fi information using a Wi-Fi receiver, location information based on an installation of a wireless device in a structure, and setup information manually input by a user of the wireless device.

8. The method of claim 1, further comprising storing results of the executing of the channel scanning scheme.

9. The method of claim 8, the selection of the channel scanning scheme for a subsequent scan being further based on stored results of a previously-executed channel scanning scheme.

10. A wireless communicating system, comprising:
    a location determining device that is configured to determine a location of the system;
    a location comparing device that is configured to compare the determined location of the system with information regarding potentially conflicting broadcasting devices located in proximity to the determined location of the system;
    a mode selecting device that is configured to select a channel scanning mode to determine actual conflicts with broadcasting devices and to execute scanning according to the selected channel scanning mode, wherein the selecting of the channel mode is based on the comparing at the location comparing device;

a radio operating in a 5 GHz frequency band, the potentially conflicting broadcasting devices being radar installations operating in DFS bands, and the selected channel scanning mode complying with DFS scanning requirements.

11. The system of claim 10, further comprising a first data storage device storing a database of known radar installation locations, the location comparing device comparing of the determined location of the system with information regarding the radar installations located in proximity to the determined location of the system including querying the stored database.

12. The system of claim 11, the mode selecting device selecting a first channel scanning mode when the comparing indicates that there are no radar installations in proximity to the determined location of the system, the first channel scanning mode scanning a single channel bandwidth that is greater than 20 MHz and is the broadest channel bandwidth that the system accommodates.

13. The system of claim 12, the broadest channel bandwidth that the system accommodates being 160 MHz.

14. The system of claim 11, the mode selecting device selecting a second channel scanning mode when the comparing indicates that there is at least one radar installation in proximity to the determined location of the system, the second channel scanning mode incrementally scanning single channel bandwidths of not more than 40 MHz that are aggregated, once determined to be clear, to achieve an aggregated channel bandwidth of at least 80 MHz.

15. The system of claim 14, the aggregating achieving an aggregated channel bandwidth of 160 MHz.

16. The system of claim 10, the location determining device including at least one of a GPS receiver, a cellular receiver, a Wi-Fi receiver, or a user interface by which a user manually inputs a location of the system.

17. The system of claim 10, further comprising a second data storage device storing results of executed scans.

18. The system of claim 17, the mode selection device being further configured to select a channel scanning mode for a subsequent scan being based on stored results of a previously-executed scan.

19. A non-transitory computer-readable medium storing computer-readable instructions which, when executed by a processor, causes the processor to execute a method for synchronizing cable data channels, the method comprising:

determining a location of a wireless device;

comparing the determined location of the wireless device with information regarding potentially conflicting broadcasting devices located in proximity to the determined location of the wireless device;

selecting based on the comparing a channel scanning scheme to determine actual conflicts with broadcasting devices; and executing the selected channel scanning scheme;

wherein the wireless device operates in the 5 GHz band, the potentially conflicting broadcasting devices being radar installations operating in DFS bands, and the selected channel scanning scheme complying with DFS scanning requirements.

20. The non-transitory computer-readable medium of claim 19 the comparing of the determined location of the wireless device with information regarding the radar installations located in proximity to the determined location of the wireless device including querying a database of known radar installation locations.

21. The non-transitory computer-readable medium of claim 20, the selecting of the channel scanning scheme comprising selecting a first channel scanning scheme when the comparing indicates that there are no radar installations in proximity to the determined location of the wireless device, the first channel scanning scheme scanning a single channel bandwidth that is greater than 20 MHz and is the broadest channel bandwidth that the wireless device accommodates.

22. The non-transitory computer-readable medium of claim 21, the broadest channel bandwidth that the wireless device accommodates being 160 MHz.

23. The non-transitory computer-readable medium of claim 20, the selecting of the channel scanning scheme comprising selecting a second channel scanning scheme when the comparing indicates that there is at least one radar installation in proximity to the determined location of the wireless device, the second channel scanning scheme incrementally scanning single channel bandwidths of not more than 40 MHz that are aggregated, once determined to be clear, to achieve an aggregated channel bandwidth of at least 80 MHz.

24. The non-transitory computer-readable medium of claim 23, the aggregating achieving an aggregated channel bandwidth of 160 MHz.

25. The non-transitory computer-readable medium of claim 19, the determining the location of the wireless device comprising receiving at least one of GPS information using a GPS receiver, cellular information using a cellular receiver, Wi-Fi information using a Wi-Fi receiver, location information based on an installation of a wireless device in a structure, and setup information manually input by a user of the wireless device.

26. The non-transitory computer-readable medium of claim 19, further comprising storing results of the executing of the channel scanning scheme.

27. The non-transitory computer-readable medium of claim 26, the selection of the channel scanning scheme for a subsequent scan being further based on stored results of a previously-executed channel scanning scheme.

28. A wireless communicating system, comprising:

a processor;

a radio;

the wireless communicating system capable to:

compare its own location with one or more locations of respective one or more radar installations operating in a Digital Frequency Selection (DFS) band in order to select a mode by which the wireless communicating system may conduct scanning, the one or more locations being stored in a database;

based on comparing, selecting a wireless connectivity scheme for the wireless system.

29. The system of claim 28, wherein the wireless connectivity scheme includes selecting a scanning mode in which the wireless system avoids scanning in the Digital Frequency Selection (DFS) bands.

30. The system of claim 28, wherein the system is capable to operate in a 5 GHz frequency band.

31. The system of claim 28, wherein the wireless connectivity scheme includes selecting a scanning mode that complies with Digital Frequency Selection (DFS) scanning requirements.

32. The system of claim 28, further comprising a first data storage device storing the database.

33. The system of claim 28, wherein the wireless connectivity scheme includes selecting a first channel scanning mode when the comparing indicates that there are no radar installations in proximity to the location of the system, the first channel scanning mode including scanning a single channel bandwidth that is the broadest channel bandwidth that the system accommodates.

34. The system of claim 33, wherein the broadest channel bandwidth that the system accommodates is 160 MHz.

35. The system of claim 28, wherein the wireless connectivity scheme includes selecting a second channel scanning mode when the comparing indicates that there is at least one radar installation in proximity to the determined location of the system, the second channel scanning mode includes incrementally scanning single channel bandwidths of not more than 40 MHz, and aggregating the 40 MHz channel bandwidth once determined to be clear.

36. The system of claim 35, wherein aggregating includes achieving an aggregated channel bandwidth of 160 MHz.

37. The system of claim 28, wherein the wireless communicating system is capable to determine its own location using at least one of a GPS receiver, a cellular receiver, a Wi-Fi receiver, or a user interface by which a user manually inputs a location of the system.

38. The system of claim 32, further comprising a second data storage device to store results of any executed scans.

39. The system of claim 31, wherein the wireless communicating system is capable to select a scanning mode for a subsequent scan based on stored results of previously-executed scan.

* * * * *